No. 714,377. Patented Nov. 25, 1902.
W. R. JEAVONS.
LIQUID LEVEL INDICATOR FOR LAMPS.
(Application filed May 1, 1902.)
(No Model.)
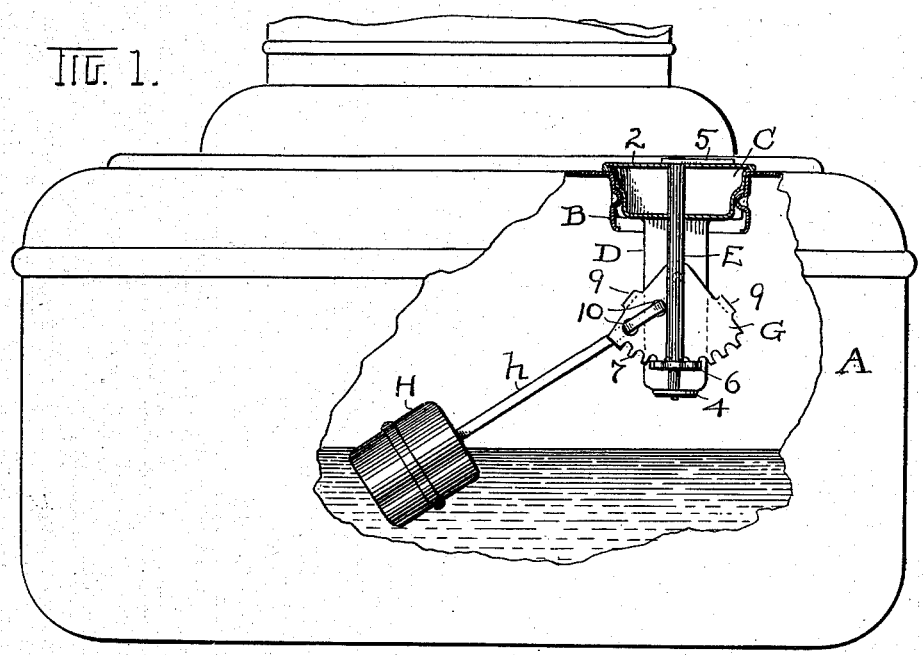
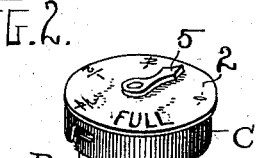
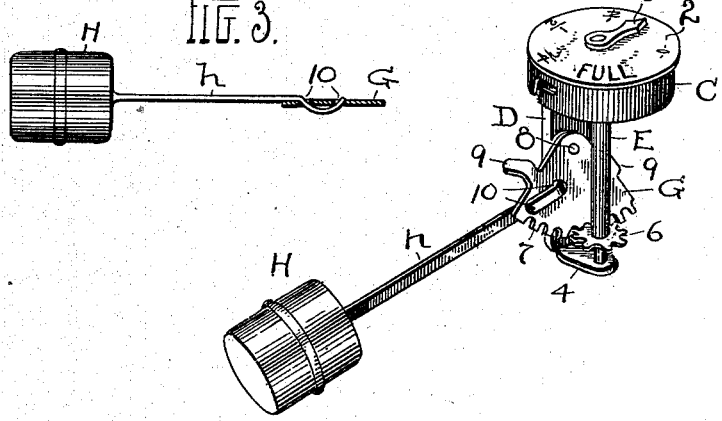
ATTEST.
R. B. Moser
T. M. Madden
INVENTOR.
William R. Jeavons
BY H. T. Fisher ATTY

UNITED STATES PATENT OFFICE.

WILLIAM R. JEAVONS, OF CLEVELAND, OHIO.

LIQUID-LEVEL INDICATOR FOR LAMPS.

SPECIFICATION forming part of Letters Patent No. 714,377, dated November 25, 1902.

Application filed May 1, 1902. Serial No. 105,545. (No model.)

*To all whom it may concern:*

Be it known that I, WILLIAM R. JEAVONS, a citizen of the United States, residing at Cleveland, in the county of Cuyahoga and State of Ohio, have invented certain new and useful Improvements in Liquid-Level Indicators for Oil-Lamps; and I do declare that the following is a full, clear, and exact description of the invention, which will enable others skilled in the art to which it appertains to make and use the same.

My invention relates to a liquid-level indicator for oil-lamps and other closed vessels; and the object of the invention is to provide an indicator which is constructed and adapted to operate substantially as shown and described, and particularly pointed out in the claims.

In the accompanying drawings, Figure 1 is a side elevation of a lamp-body with a portion broken away and disclosing my new and improved level-indicating mechanism in working position thereon. Fig. 2 is a perspective view of said mechanism alone, and Fig. 3 is a plan view of the float and its arm.

A represents what in this instance is a lamp or lamp-body, but which may be any other vessel adapted to hold liquid and which it is desirable to have equipped with a liquid-level attachment of this kind. In the case of a lamp, and especially in those that have opaque bodies, so that the contents cannot be seen through them, it is difficult to tell how much oil there may be in the same or how nearly empty or filled it may be as lamps usually are made and used; but with my new device the exact level of the oil, whether high or low or intermediate, can be seen at a glance and is always manifest on the top of the lamp. To this end I provide the opening in the lamp with a shell or casing B and occupy this with a suitable plug or cork C, which in this case is struck up from sheet metal and provided with a bayonet-joint connection in its seat, whereby it may be rotated only a slight distance and yet be safely seated and be easily removed in like manner. Such slight rotation is important because of the mechanism carried by the cork. The top or cover 2 of this plug or cork is constituted a dial, with suitable marks thereon for reading the state or depth of the contents of vessel A. Pendent from said plug is a hanger D, with a lower horizontal portion 4 lying beneath the center of the cork. and a spindle or shaft E is supported thereon and extends centrally through the cork and dial-plate 2 and has an indicator-finger 5 fixed thereon, like the finger or hand of a clock. This or any equivalent indicator may be used. On the lower end or portion of said shaft E, I have a spur-wheel 6, and a segmental rack G has its teeth 7 in mesh therewith. The said rack or segment is pivoted at 8 on hanger D, and arm *h* of float H is rigidly fixed to said segment G, which has lateral lugs or projections 9, adapted to engage the edges of hanger D and limit the rotation of said segment on its pivot.

Obviously the movement of the float in either direction, up or down, will tell on the indicating mechanism, and finger or indicator 5 is set in respect thereto and to the face of the dial to tell the exact level of the liquid in the vessel at all times.

Segment G is shown as having two holes 10, through which the end of float-arm *h* is extended, first on a curvature, as seen in Fig. 3, so as to get the end of the arm through the second hole 10, and then this portion of the arm is flattened, and thus also securely locked in the segment. This construction of the parts enables arm *h* to be cut off to any desired length, according to the size of the vessel used, and then fastened without special fastening means other than the holes in which it is engaged. As thus shown and described the plug and its attachments constitute together an article of manufacture and sale and are together attachable and detachable or removable from the vessel. The bayonet-joint is important for this reason, as by only a short turn it enables me to disconnect the plug, and thus only a short sweep of the float is required.

What I claim is—

1. A vessel and a level-indicating mechanism therein comprising a plug for the vessel, a hanger on said plug and a spindle supported from said hanger, an indicator on said spindle at the top of the plug a wheel thereon beneath the plug, a segmental rack pivoted on said hanger and engaging said wheel, and a float rigidly engaged with said rack, substantially as described.

2. A plug having a dial on its upper face, a hanger projecting from the lower portion of said plug, a spindle having its lower end journaled in said hanger and projecting through said plug and carrying an indicator to travel over the dial, a wheel on said spindle and a segmental rack engaged therewith and pivoted on said hanger and having stops to limit its rotation, and a float engaged with said rack, substantially as described.

Witness my hand to the foregoing specification this 26th day of April, 1902.

WILLIAM R. JEAVONS.

Witnesses:
R. B. MOSER,
T. M. MADDEN.